United States Patent
Brill

(10) Patent No.: US 7,048,087 B2
(45) Date of Patent: May 23, 2006

(54) EXTERNAL SHAFT LOW FLOOR DRIVE AXLE ASSEMBLY

(75) Inventor: Lawrence D. Brill, Westerville, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 339 days.

(21) Appl. No.: 10/649,853

(22) Filed: Aug. 26, 2003

(65) Prior Publication Data

US 2005/0045412 A1    Mar. 3, 2005

(51) Int. Cl.
*B60K 17/04* (2006.01)

(52) U.S. Cl. ............... 180/371; 180/375; 180/376; 180/378

(58) Field of Classification Search ........ 180/371, 180/372, 374, 375, 376, 378, 385, 344, 346, 180/349, 356, 361
See application file for complete search history.

(56) References Cited

U.S. PATENT DOCUMENTS

| 1,086,917 | A |   | 2/1914  | Horstmann |         |
|-----------|---|---|---------|-----------|---------|
| 1,184,814 | A |   | 5/1916  | Bollstrom |         |
| 1,424,867 | A |   | 8/1922  | Wolf      |         |
| 1,475,331 | A | * | 11/1923 | Wales     | 280/790 |
| 2,381,672 | A |   | 7/1945  | Lee       |         |
| 3,035,655 | A | * | 5/1962  | Lee       | 180/234 |
| 3,860,082 | A |   | 1/1975  | Testore   |         |
| 3,948,337 | A |   | 4/1976  | Richardson|         |
| 4,100,986 | A |   | 7/1978  | Shipitalo |         |
| 5,433,287 | A | * | 7/1995  | Szalai et al. | 180/353 |
| 6,035,956 | A |   | 3/2000  | Maurer et al. |     |
| 6,793,035 | B1| * | 9/2004  | Bennett et al. | 180/358 |
| 6,843,746 | B1| * | 1/2005  | Hayes et al. | 475/160 |
| 6,871,723 | B1| * | 3/2005  | Varela    | 180/348 |
| 6,886,655 | B1| * | 5/2005  | Varela et al. | 180/343 |

FOREIGN PATENT DOCUMENTS

| EP | 0 456 096 A1 | 11/1991 |
| EP | 1 348 587 A  | 10/2003 |

OTHER PUBLICATIONS

Int'l Search Report dated Dec. 29, 2004.
U.S. Appl. No. 10/077,362, filed Feb. 15, 2002 and assigned to Meritor Heavy Vehicle Technology, LLC.

* cited by examiner

Primary Examiner—Paul N. Dickson
Assistant Examiner—Tiffany Webb
(74) Attorney, Agent, or Firm—Carlson, Gaskey & Olds

(57) ABSTRACT

An inverted portal drive axle includes an off-center driving input that is coupled to first and second axle shafts. The first axle shaft drives a first gear box that is coupled to a first wheel assembly. The second axle shaft extends underneath a vehicle floor and drives a second gear box that is coupled to a second wheel assembly. An axle housing extends between the first and second gear boxes. The second axle shaft includes an exposed central portion that is positioned directly between the vehicle floor and the axle housing. Seal assemblies seal first and second ends of the second axle shaft to the axle housing.

20 Claims, 2 Drawing Sheets

EXTERNAL SHAFT LOW FLOOR DRIVE AXLE ASSEMBLY

BACKGROUND OF THE INVENTION

This invention relates to drive axle assembly, and more particularly to an inverted portal drive axle assembly with an external shaft for driving a mass transit vehicle where the drive axle assembly provides a significantly lower floor profile.

Mass transit vehicles, such as trolley cars, buses, and the like typically have seats aligned at the lateral sides of the vehicle, with a central aisle and floor extending along the vehicle. In order to facilitate entering and exiting from the vehicle, it is desirable to have the vehicle floor and aisle positioned relatively low to the ground. This provides faster cycle time during stops and facilitates boarding for all passengers, especially for elderly and disabled passengers, as well as for children.

Mass transit vehicles typically have several axles that support, drive and steer the vehicle. Many such vehicles provide a rigid axle having an input positioned off-center near one wheel end to form an inverted portal axle configuration. This configuration permits the vehicle floor to be positioned closer to ground level than would occur with a traditional drive axle configuration, i.e., a non-inverted portal axle configuration. However, there still is a need to move the vehicle floor even closer to the ground.

A traditional inverted portal axle configuration has a short axle shaft that drives one wheel assembly and a long axle shaft that drives the opposite wheel assembly. The axle shafts have different lengths due to the input being positioned off-center, i.e., the input is positioned closer to one wheel assembly than the other wheel assembly. The axle shafts are enclosed within an axle housing that extends between the wheel assemblies and underneath the vehicle floor.

One disadvantage with the inverted portal axle configuration is that the low floor profile is limited by the portal axle housing. There is a minimum required clearance distance between the vehicle floor and the axle housing. There is also a minimum required clearance distance between the axle housing and the axle shaft. Currently, the height between the vehicle floor and ground level is limited by sum of these two (2) minimum required clearance distances plus the wall thickness of the housing.

Accordingly, it is desirable to provide an inverted portal axle configuration that provides an improved low floor profile to facilitate access to the vehicle as well as overcoming the other above-mentioned deficiencies with the prior art.

SUMMARY OF THE INVENTION

An inverted portal drive axle includes an axle housing that extends underneath a vehicle floor. A driving input is coupled to an axle shaft assembly that drives first and second wheel assemblies. A portion of the axle shaft assembly is enclosed within the housing and a portion of the axle shaft assembly is exposed and is positioned above the axle housing.

In one disclosed embodiment, the inverted portal drive axle includes a differential that is driven by a vehicle power source. A first axle shaft has one end coupled to the differential and an opposite end coupled to a first gear box. A second axle shaft has one end coupled to the differential and an opposite end coupled to a second gear box. The first and second gear boxes in turn drive first and second wheel assemblies, respectively. The differential is positioned closer to the first wheel assembly than the second wheel assembly, thus the second axle shaft is significantly longer than the first axle shaft. The axle housing extends underneath a vehicle floor between the first and second gear boxes. The housing includes an exterior surface having a portion that faces the vehicle floor and includes an interior surface that defines an enclosed cavity. A central portion of the second axle shaft is positioned outside of the enclosed cavity between the external surface of the axle housing and the vehicle floor.

In one disclosed embodiment, the axle housing includes an externally formed ledge that extends along the length of the axle housing. The ledge includes a horizontal surface that transitions into a vertical surface. The horizontal surface is positioned directly underneath the second axle shaft and the vertical surface is positioned directly adjacent to one side of the axle shaft.

In one disclosed embodiment, portions of the first and second ends of the second axle shaft are enclosed within the axle housing. Seal assemblies provide a sealing interface between the ends of the second axle shaft and the axle housing to seal oil within the housing and to prevent outside contamination.

The subject invention provides an inverted portal drive axle with an exposed axle shaft, which provides an improved low floor profile to facilitate access to a vehicle. These and other features of the present invention can be best understood from the following specifications and drawings, the following of which is a brief description.

DETAILED DESCRIPTION OF A PREFERRED EMBODIMENT

Figure 1A:
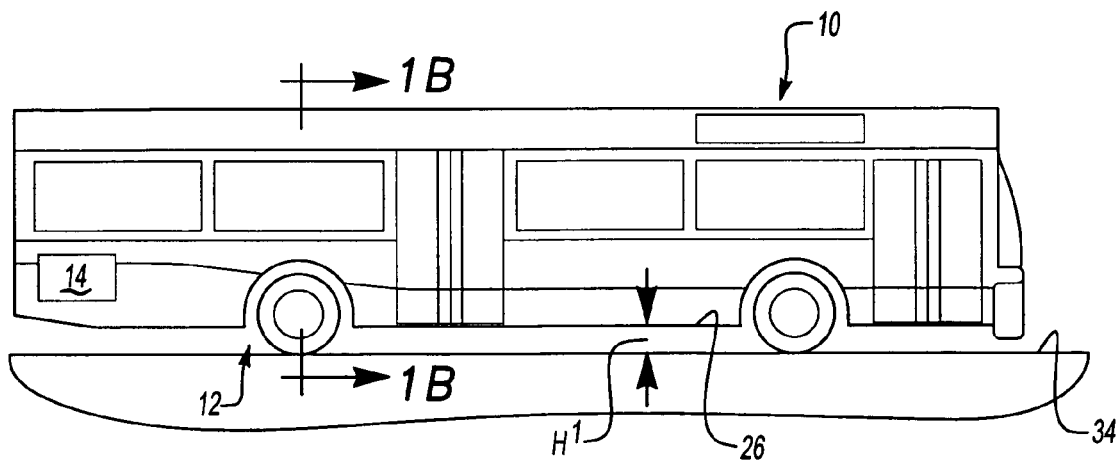
FIG. 1A is side view of a vehicle incorporating a prior art inverted portal drive axle assembly.
Figure 1B:
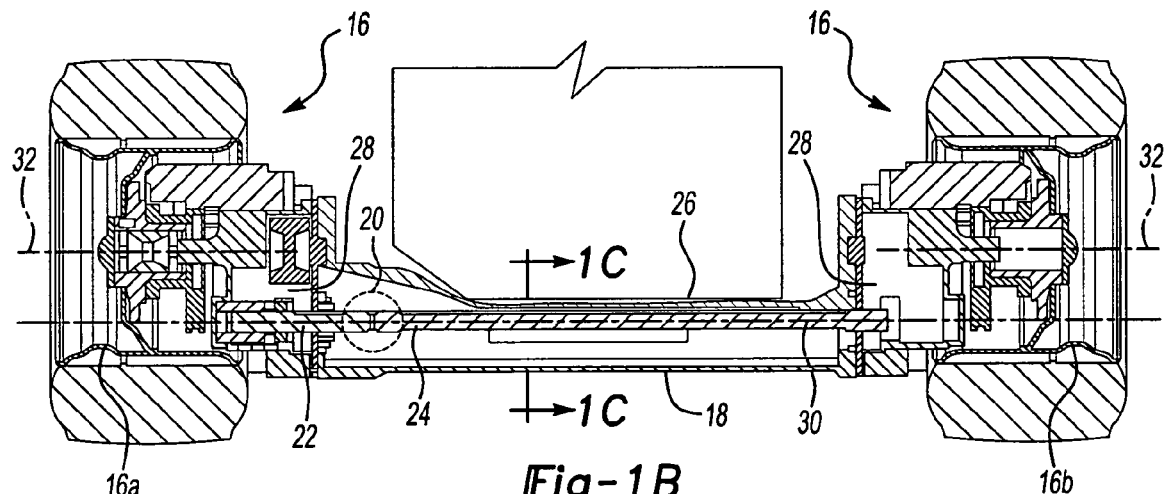
FIG. 1B is a cross-sectional view as indicated at line 1B of FIG. 1A.
Figure 1C:
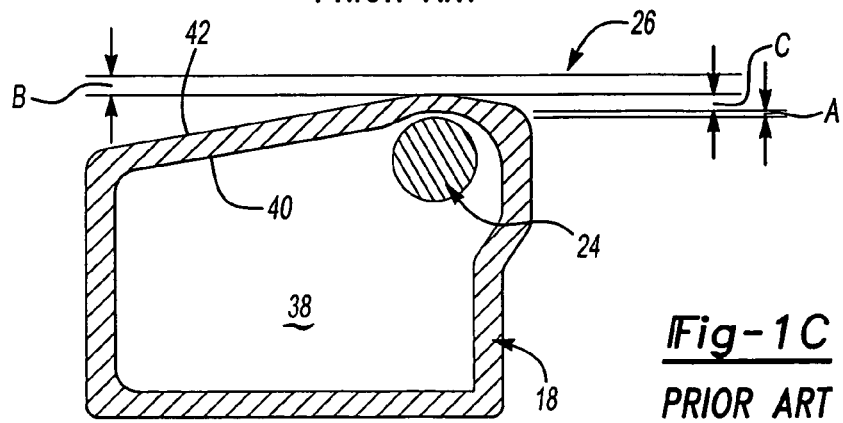
FIG. 1C is a cross-sectional view as indicated at line 1C of FIG. 1B.

A vehicle 10 incorporating a traditional inverted portal axle 12 is shown in FIGS. 1A–1C. The inverted portal axle 12 is driven by a vehicle power source 14 and includes a pair of wheel assemblies 16 and an axle housing 18 extending between the wheel assemblies 16. The vehicle power source 14 could be a gas or diesel engine, an electric motor, a hybrid power source, or any other similar power source known in the art.

A driving axle input 20, coupled to the vehicle power source 14, is positioned to one lateral side of vehicle centerline. Preferably, the driving input 20 comprises a differential that permits speed differentiation between the laterally spaced wheel assemblies 16. The operation of a differential is well-known in the art and will not be discussed in detail.

The inverted portal axle 12 has a short axle shaft 22 that drives one wheel assembly 16a and a long axle shaft 24 that extends underneath a vehicle floor 26 to drive the opposite wheel assembly 16b. The axle shafts 22, 24 have different lengths due to the input 20 being positioned off-center, i.e., the input 20 is positioned closer to one wheel assembly 16a than the other wheel assembly 16b. The axle shafts 22, 24 are enclosed within the axle housing 18 that extends between the wheel assemblies 16a, 16b and underneath the vehicle floor 26.

Each of the axle shafts 22, 24 is coupled to a gear box 28. The gear boxes 28 drive the wheel assemblies 16a, 16b. The axle shafts 22, 24 define an axle shaft axis of rotation 30 and the wheel assemblies 16a, 16b define a wheel assembly axis of rotation 32. The axle shaft axis of rotation 30 is parallel to and spaced apart from the wheel axis of rotation 32. The gear boxes 28 are used to transfer the driving power from the input 20 at the axle shaft level, up to the wheel assemblies 16a, 16b at the wheel axis of rotation level. Thus, the axle shaft axis of rotation 30 is vertically lower to ground level 34 than the wheel axis of rotation 32.

The inverted portal axle 12 defines a floor profile having a height H1 between the vehicle floor 26 and ground 34. The inverted portal axle configuration, with the central low driving input 20 that is raised up to the wheel assemblies 16 at the sides of the vehicle 10, permits the vehicle floor 26 to be positioned close to the ground level 34. However, there is a need to have the floor 26 positioned even closer to the ground level 34.

Currently, the axle housing 18 limits the distance that the floor 26 can be lowered toward the ground 34. As discussed above, the longer axle shaft 24, which is enclosed within an interior cavity 38 of the axle housing 18, runs underneath the vehicle floor 26 from the driving input 20 to the opposite gear box 28. As shown in FIG. 1C, a first minimum clearance distance A is required between an interior surface 40 of the axle housing 18 and the rotating axle shaft 24. A second minimum clearance distance B is required between the vehicle floor 26 and an exterior surface 42 of the axle housing 18. Further, there is a minimum wall thickness C required for the axle housing 18. Thus, a total distance from the vehicle floor 26 to the rotating axle shaft 24 is A+B+C.

Figure 2A:
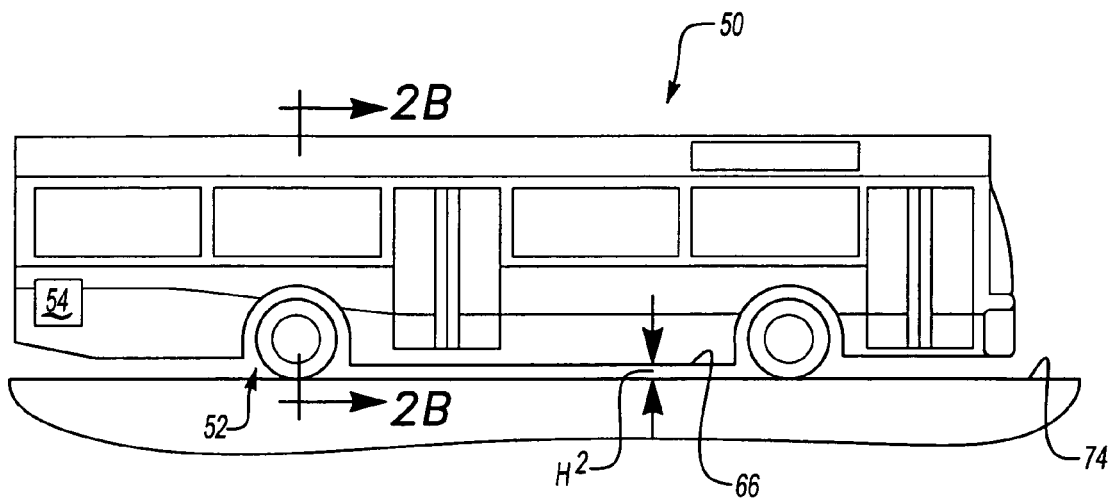
FIG. 2A is a side view of a vehicle with an inverted portal drive axle assembly incorporating the subject invention.
Figure 2B:
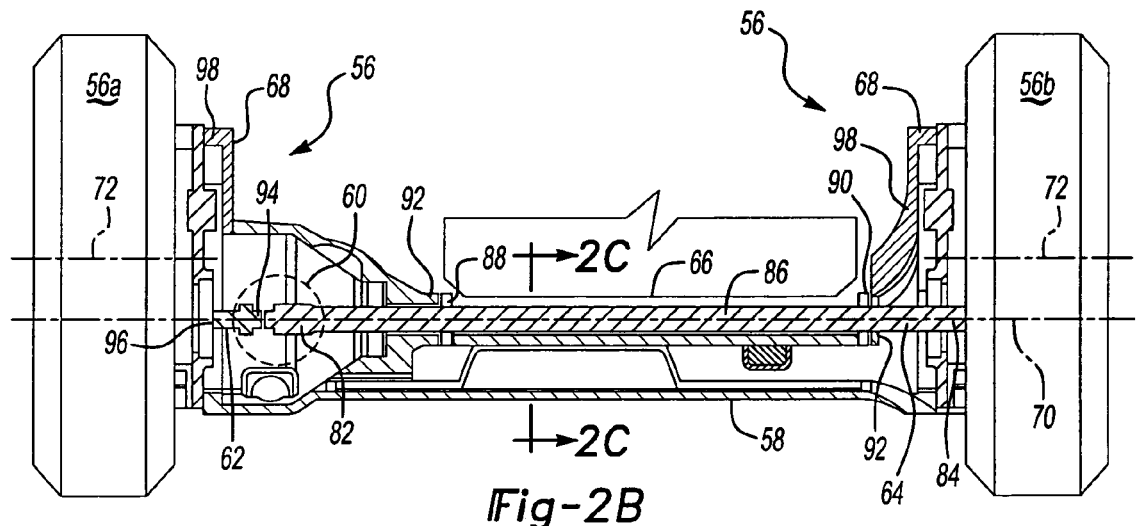
FIG. 2B is a schematic cross-sectional view, partially broken away, as indicated at line 2B of FIG. 2A.
Figure 2C:
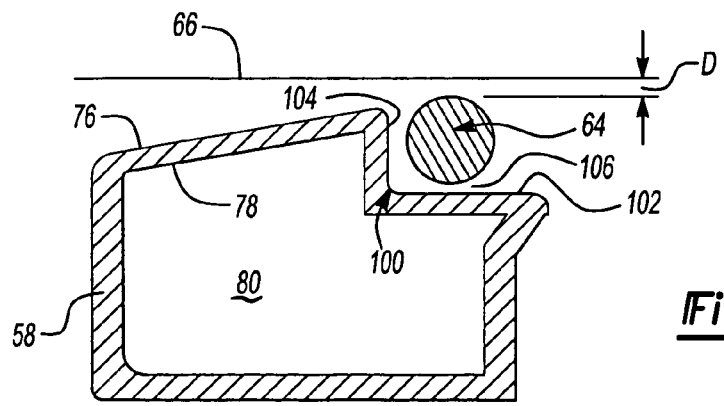
FIG. 2C is a cross-sectional view as indicated at line 2C of FIG. 2B.

In order to facilitate ingress and egress from vehicles such as buses, trolley cars, etc., it is desirable to move the vehicle floor 26 even lower to the ground level. A vehicle 50 with a unique inverted portal drive axle assembly 52 is shown in FIGS. 2A–2C. The inverted portal axle 52 is driven by a vehicle power source 54 and includes a pair of wheel assemblies 56 and an axle housing 58 extending between the wheel assemblies 56. As discussed above, the vehicle power source 54 could by any type of power source known in the art.

A driving axle input 60, coupled to the vehicle power source 54, is positioned to one lateral side of vehicle centerline. The driving input 60 preferably comprises a differential. The inverted portal axle 52 has a short axle shaft 62 that drives one wheel assembly 56a and a long axle shaft 64 that extends underneath a vehicle floor 66 to drive the opposite wheel assembly 56b. The axle shafts 62, 64 have different lengths due to the input 60 being positioned off-center, i.e., the input 60 is positioned closer to one wheel assembly 56a than the other wheel assembly 56b.

The axle housing 58 extends between the wheel assemblies 56a, 56b and underneath the vehicle floor 66. The shorter axle shaft 62 is enclosed within the axle housing 58. The longer axle shaft 64 includes a significant exposed portion that is positioned between the vehicle floor 66 and the axle housing 58.

Each of the axle shafts 62, 64 is coupled to a gear box 68. The gear boxes 68 drive the wheel assemblies 56a, 56b. The axle shafts 62, 64 define an axle shaft axis of rotation 70 and the wheel assemblies 56a, 56b define a wheel assembly axis of rotation 72. The axle shaft axis of rotation 70 is parallel to and spaced apart from the wheel axis of rotation 72. The gear boxes 68 are used to transfer the driving power from the input 60 at the axle shaft level, up to the wheel assemblies 56a, 56b at the wheel axis of rotation level. Thus, the axle shaft axis of rotation 70 is vertically lower to ground level 74 than the wheel axis of rotation 72.

The inverted portal axle 52 defines a floor profile having a height H2 between the vehicle floor 66 and ground level 74. The inverted portal axle configuration, with the exposed longer axle shaft 64, permits the vehicle floor 66 to be positioned closer to the ground level 74 than the traditional inverted portal drive axle assembly 12.

As shown in FIG. 2C, the axle housing 58 includes an external surface 76 facing the vehicle floor 66 and an interior surface 78 defining an enclosed cavity 80. The longer axle shaft 64 includes a first end 82 coupled to the driving input 60, a second end 84 coupled to the gear box 68 to drive the wheel assembly 56b, and an exposed central portion 86 interconnecting the first 82 and second 84 ends. The central portion 86 of the axle shaft 64, i.e. the portion that extends underneath an aisle portion of the vehicle floor 66, is positioned outside the enclosed cavity 80 between the external surface 76 and the vehicle floor 66.

At least a portion of the first 82 and second 84 ends are enclosed within the axle housing 58. A first seal assembly 88 is in sealing engagement between the first end 82 of the axle shaft 64 and the axle housing 58 and a second seal assembly 90 is in sealing engagement between the second end 84 of the axle shaft 64 and the axle housing 58. The axle housing 58 includes a web portion 92 for seating the seal assemblies 88, 90. Further, the seal assemblies 88, 90 preferably include debris shields such that seal assemblies 88, 90 contain lubricating oil within the axle housing 58 while simultaneously preventing contamination from outside particulates.

The shorter axle shaft 62 has a first end 94 coupled to the driving input 60 and a second end 96 coupled to one of the gear boxes 68. The first end 94 is enclosed within the cavity 80 of the axle housing 58 and the second end 96 extends into a gear box housing 98. Similarly, the second end 84 of the longer axle shaft 64 extends into a gear box housing 98 coupled to the other wheel assembly 56b.

The axle housing 58 includes an externally formed ledge 100 extending in a direction parallel to the axle shaft and wheel axes of rotation 70, 72. The ledge 100 includes a horizontal surface 102 that transitions into a vertical surface 104 to form an L-shaped recess 106 that receives the axle shaft 64. The horizontal surface 102 is positioned immediately underneath the axle shaft 64 and the vertical surface 104 is positioned immediately adjacent to one side of the axle shaft 64. This configuration allows the vehicle floor 66 to be lowered by a distance equal to A+C, which generally equates to 14–20 mm. The clearance between the axle shaft 64 and the vehicle floor 66 remains the same as the clearance between the floor 26 and the axle housing 18, i.e., B=D, in the traditional configuration.

Thus, this unique inverted portal drive axle assembly 52 provides for a lower vehicle floor 66 by positioning a central portion of the longer axle shaft 64 above the axle housing 58 and below the vehicle floor 66. Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. An inverted portal drive axle comprising:
a driving input including a differential;
a first wheel assembly driven by said driving input about a wheel axis of rotation;
a second wheel assembly laterally spaced from said first wheel assembly and driven by said driving input about said wheel axis of rotation;
an axle housing extendable underneath a vehicle floor between said first and second wheel assemblies, said axle housing defining an enclosed cavity that houses said differential; and
at least one axle shaft operably coupled to said differential and operably coupled to drive at least one of said first and second wheel assemblies wherein one end of said at least one axle shaft is at least partially received within said enclosed cavity and wherein said at least one axle shaft has an exposed portion that is positioned outside of said enclosed cavity above said axle housing.

2. The inverted portal drive axle as set forth in claim 1 wherein said axle housing includes an external surface facing the vehicle floor and an interior surface defining said enclosed cavity and wherein a central portion of said at least one axle shaft is positioned outside said enclosed cavity between said external surface and the vehicle floor.

3. The inverted portal drive axle according to claim 1 wherein said driving input is positioned laterally closer to said first wheel assembly than to said second wheel assembly and wherein said at least one axle shaft includes a first axle shaft having a first end coupled to said driving input, a second end coupled to said second wheel assembly, and an exposed central portion interconnecting said first and second ends.

4. The inverted portal drive axle as set forth in claim 3 wherein at least a portion of each of said first and second ends is enclosed within said axle housing.

5. The inverted portal drive axle as set forth in claim 4 including a first seal assembly in sealing engagement between said first end and said axle housing and a second seal assembly in sealing engagement between said second end and said axle housing.

6. The inverted portal drive axle as set forth in claim 3 wherein said at least one axle shaft further includes a second axle shaft having a third end driven by said driving input and a fourth end coupled to said first wheel assembly, said first axle shaft being significantly longer than said second axle shaft.

7. The inverted portal drive axle as set forth in claim 1 wherein said at least one axle shaft is non-collinear with said wheel axis of rotation.

8. The inverted portal drive axle as set forth in claim 1 wherein said axle housing comprises a plurality of housing walls that define said enclosed cavity with at least one of said plurality of housing walls being transverse to another of said plurality of housing walls.

9. The inverted portal drive axle as set forth in claim 8 wherein said at least one axle shaft has a first shaft end coupled to said differential and a second shaft end coupled to said at least one of said first and second wheel assemblies, with said first and second shaft ends being enclosed within said enclosed cavity, and wherein said axle housing includes a first seal mount portion and a second seal mount portion and including a first seal assembly in sealing engagement between said first shaft end and said first seal mount portion and a second seal assembly in sealing engagement between said second shaft end and said second seal mount portion.

10. An inverted portal drive axle comprising:
a driving input;
a first wheel assembly driven by said driving input about a wheel axis of rotation;
a second wheel assembly laterally spaced from said first wheel assembly and driven by said driving input about said wheel axis of rotation;
an axle housing extendable underneath a vehicle floor between said first and second wheel assemblies; and
at least one axle shaft operably coupled to said driving input and operably coupled to drive at least one of said first and second wheel assemblies wherein said axle shaft is positioned above said axle housing and wherein said axle housing includes an externally formed ledge extending in a direction parallel to said wheel axis of rotation, said ledge comprising a horizontal surface transitioning into a vertical surface wherein said horizontal surface is positioned immediately underneath said at least one axle shaft and said vertical surface is positioned immediately adjacent to one side of said at least one axle shaft.

11. An inverted portal drive axle comprising:
a driving input;
a first axle shaft having a first end coupled to said driving input and a second end coupled to a first gear box;
a first wheel assembly driven by said first gear box;
a second axle shaft having a first end coupled to said driving input and a second end coupled to a second gear box wherein said second axle shaft is significantly longer than said first axle shaft;
a second wheel assembly driven by said second gear box; and
an axle housing extendable underneath a vehicle floor between said first and second gear boxes, said axle housing having an exterior surface and an interior surface defining an enclosed cavity wherein a central portion of said second axle shaft is positioned outside of said enclosed cavity directly above said external surface.

12. The inverted portal drive axle as set forth in claim 11 wherein said first and second wheel assemblies define a wheel axis of rotation and said first and second axle shafts define an axle shaft axis of rotation that is parallel to and spaced apart from said wheel axis of rotation.

13. The inverted portal drive axle as set forth in claim 12 wherein said driving input comprises a differential driven by a vehicle power source, said differential being positioned laterally closer to said first wheel assembly than to said second wheel assembly.

14. The inverted portal drive axle as set forth in claim 13 wherein said first end of said first axle shaft is enclosed within said enclosed cavity and said second end of said first axle shaft is enclosed within said first gear box.

15. The inverted portal drive axle as set forth in claim 14 wherein at least a portion of said first and second ends of said second axle shaft are enclosed within said enclosed cavity and wherein said second axle shaft includes an exposed central portion extendable underneath the vehicle floor that interconnects said first and second ends.

16. The inverted portal drive axle as set forth in claim 15 including a first seal assembly in sealing engagement between said first end of said second axle shaft and said axle housing and a second seal assembly in sealing engagement between said second end of said second axle shaft and said axle housing.

17. The inverted portal drive axle as set forth in claim 13 wherein said axle housing includes an externally formed ledge extending in a direction parallel to said wheel axis of rotation, said ledge comprising a horizontal surface transitioning into a vertical surface to form an L-shaped recess, said central portion of said second axle shaft being received within said recess.

18. The inverted portal drive axle as set forth in claim 11 wherein said axle housing includes a first seal mount portion and a second seal mount portion and including a first seal assembly in sealing engagement between said first end of said second axle shaft and said first seal mount portion and a second seal assembly in sealing engagement between said second end of said second axle shaft and said second seal mount portion.

19. The inverted portal drive axle as set forth in claim 11 wherein said axle housing comprises a plurality of housing walls that define said enclosed cavity with at least one of said plurality of housing walls being transverse to another of said plurality of housing walls.

20. The inverted portal drive axle as set forth in claim 19 wherein said driving input comprises a differential that is positioned within said enclosed cavity.

* * * * *